United States Patent
Irie et al.

(10) Patent No.: US 8,305,316 B2
(45) Date of Patent: Nov. 6, 2012

(54) COLOR LIQUID CRYSTAL DISPLAY DEVICE AND GAMMA CORRECTION METHOD FOR THE SAME

(75) Inventors: Kentaro Irie, Tsu (JP); Fumikazu Shimoshikiryoh, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1222 days.

(21) Appl. No.: 12/083,011

(22) PCT Filed: May 31, 2006

(86) PCT No.: PCT/JP2006/310853
§ 371 (c)(1),
(2), (4) Date: Apr. 3, 2008

(87) PCT Pub. No.: WO2007/052381
PCT Pub. Date: May 10, 2007

(65) Prior Publication Data
US 2009/0153454 A1 Jun. 18, 2009

(30) Foreign Application Priority Data
Oct. 31, 2005 (JP) .................................. 2005-316676

(51) Int. Cl.
*G09G 3/36* (2006.01)
(52) U.S. Cl. ................. 345/88; 345/89; 345/87
(58) Field of Classification Search .............. 345/89
See application file for complete search history.

(56) References Cited

U.S. PATENT DOCUMENTS

| | | | | |
|---|---|---|---|---|
| 6,801,220 B2 * | 10/2004 | Greier et al. | ............... | 345/694 |
| 6,859,194 B2 | 2/2005 | Aoyama et al. | | |
| 6,954,193 B1 * | 10/2005 | Andrade et al. | ................. | 345/90 |
| 7,113,159 B2 | 9/2006 | Sawabe | | |
| 7,595,784 B2 | 9/2009 | Yamamoto et al. | | |
| 2002/0140649 A1* | 10/2002 | Aoyama et al. | ................... | 345/87 |
| 2003/0146893 A1* | 8/2003 | Sawabe | ........................... | 345/89 |
| 2003/0227429 A1* | 12/2003 | Shimoshikiryo | .............. | 345/90 |
| 2004/0001167 A1* | 1/2004 | Takeuchi et al. | ................ | 349/38 |
| 2005/0162360 A1 | 7/2005 | Ishihara et al. | | |
| 2005/0184944 A1 | 8/2005 | Miyata et al. | | |
| 2005/0231457 A1 | 10/2005 | Yamamoto et al. | | |
| 2005/0253797 A1 | 11/2005 | Kamada et al. | | |

FOREIGN PATENT DOCUMENTS

JP 2001-222264 8/2001

(Continued)

*Primary Examiner* — Quan-Zhen Wang
*Assistant Examiner* — David Lee
(74) *Attorney, Agent, or Firm* — Harness, Dickey & Pierce, PLC.

(57) ABSTRACT

A color liquid crystal display device, configured to employ a pixel division method with two or more sub-pixels obtained by spatial or temporal division of one pixel in a division ratio, may include pixel formation portions configured to form a pixel with the sub-pixels; a drive circuit configured to provide each pixel formation portion with applied voltages based on a gradation value; a gamma correction part configured to correct a relationship between the gradation and luminance values of the pixel to be formed by that pixel formation portion; and a common electrode. The gamma correction part may suppress gradation dependence of chromaticity when the screen is viewed from a front and from an oblique direction. The gradation value may be determined by an area ratio of a first sub-pixel electrode to a second sub-pixel electrode and a difference in applied voltages between first and second auxiliary electrodes.

5 Claims, 9 Drawing Sheets

FOREIGN PATENT DOCUMENTS

| | | |
|---|---|---|
| JP | 2002-258813 | 9/2002 |
| JP | 2002-296608 | 10/2002 |
| JP | 2005-250085 | 9/2005 |
| JP | 2005-258404 | 9/2005 |
| JP | 2006-5828 | 1/2006 |

* cited by examiner (A)            (B)

(A)            (B)

(A)

(B)

COLOR LIQUID CRYSTAL DISPLAY DEVICE AND GAMMA CORRECTION METHOD FOR THE SAME

TECHNICAL FIELD

The present invention relates to a color liquid crystal display device employing a pixel division method, in which each pixel of a displayed image is composed of a predetermined number of two or more sub-pixels obtained by spatial or temporal division of one pixel, and more specifically to an improvement of color reproducibility in such a color liquid crystal display device.

BACKGROUND ART

Usually in a display device, for the purpose of a good reproduction of an image represented by a video signal provided from outside as an input signal, gradation or the like indicated by the input signal is corrected for adjusting a relationship between a gradation value indicated by the input signal and a luminance value of an image actually displayed. Such correction is called "gamma correction".

A liquid crystal display device displays an image represented by an input signal by controlling an applied voltage of liquid crystal according to the input signal and thereby changing light transmittance of the liquid crystal. In such a liquid crystal display device, the gamma correction is also carried out by correcting the gradation value or the like indicated by the input signal according to a relationship between the applied voltage and the transmittance of the liquid crystal (hereinafter, referred to as "VT characteristics").

Meanwhile, the liquid crystal display device controls the transmittance by applying a voltage across a liquid crystal layer sandwiched between a pair of polarizer plates and thereby changing a phase difference (retardation) of the liquid crystal layer. Recently, a vertical alignmnent (VA) mode of the liquid crystal is used for an application to a television (TV) and a monitor, which is a normally black mode showing a black image without the applied voltage and provides a high quality black image and a high contrast. In this VA mode, the retardation of the liquid crystal has a wavelength dependence. Therefore, in a color liquid crystal display device which displays a color image using three kinds of pixels, R (red), G (green), and B (blue), the VT characteristics are slightly different among the three kinds of pixels.

Accordingly, there has been conventionally proposed a liquid crystal display device which carries out the gamma correction independently for each R, G, and B for obtaining a good color reproducibility in a displayed image (hereinafter, such a gamma correction carried out independently for each R, G, and B is referred to as "RGB independent gamma correction", or simply "independent gamma correction"). For example, Japanese Unexamined Patent Application Publication No. 2002-258813 (patent reference 1) discloses a color liquid crystal display device which determines γ-curves of R, G, and B individually by generating gradation voltages independently for each R, G, and B (carries out the independent gamma correction). Also, Japanese Unexamined Patent Application Publication No. 2001-222264 (patent reference 2) discloses a liquid crystal display device including a storage means for storing gamma correction data for R, G, and B generated on the basis of each luminance characteristics of an R pixel, G pixel, and B pixel arranged in a matrix on a liquid crystal panel, and a gamma correction means for individually correcting an R signal, G signal, and B signal composing a video signal to be supplied to the R pixel, G pixel, and B pixel, respectively, on the basis of the gamma correction data for R, G, and B (carrying out the independent gamma correction).

Patent reference 1: Japanese Unexamined Patent Application Publication No. 2002-258813
Patent reference 2: Japanese Unexamined Patent Application Publication No. 2001-222264
Patent reference 3: Japanese Unexamined Patent Application Publication No. 2004-78157
Patent reference 4: Japanese Unexamined Patent Application Publication No. 2004-62146
Patent reference 5: Japanese Unexamined Patent Application Publication No. 2005-173573

DISCLOSURE OF THE INVENTION

Problems to be Solved by the Invention

In a liquid crystal display device using a VA mode, γ-characteristics are different between a case where a display screen is viewed from the front thereof (in a front view) and a case where the display screen is viewed with an angle (in an oblique view). Therefore, the transmittance of the liquid crystal in the oblique view becomes higher than that in the front view and display on the screen appears as floating in white (white floating). Various methods have been proposed for improving such white floating in the oblique view (more generally, for improving a viewing angle dependence of the γ-characteristics).

For example, Japanese Unexamined Patent Application Publication No. 2004-78157 (patent reference 3) and Japanese Unexamined Patent Application Publication No. 2004-62146 (patent reference 4) disclose liquid crystal display devices employing a pixel division method which can improve the viewing angle dependence of the γ-characteristics representing a relationship between the gradation value and the display luminance value. Each of these liquid crystal display devices employing the pixel division method has a plurality of pixels arranged in a matrix, each having a liquid crystal layer and a plurality of electrodes for applying voltages on the liquid crystal layer. Each of the plurality of pixels has a first sub-pixel and a second sub-pixel where voltages different from each other can be applied on the liquid crystal layer, respectively. In such a configuration, a luminance value (or transmittance value) of each pixel is provided on the basis of luminance values (or transmittance values) different from each other in the first sub-pixel and the second sub-pixel, respectively. Providing a difference of the luminance (or transmittance) between sub-pixels in one pixel in this manner improves the viewing angle dependence of the γ-characteristics.

Here, while each pixel is divided spatially into the plurality of sub-pixels (the first sub-pixel and the second sub-pixel) in these liquid crystal display devices, instead each pixel may be configured to be divided temporally into a plurality of sub-pixels, that is, may be configured such that one frame period is divided into a plurality of sub-frames, a luminance difference is provided among the plurality of sub-frame periods, and an average luminance value of the plurality of sub-frame periods becomes a luminance value of each pixel (refer to e.g., Japanese Unexamined Patent Application Publication No. 2005-173573 (patent reference 5)). A temporal pixel division method as in the latter case also can improve the viewing angle dependence of the γ-characteristics.

Also in the liquid crystal display device employing the pixel division method (spatial or temporal) as described above, the independent gamma correction is carried out and a gradation dependence of chromaticity is suppressed to obtain a good color reproducibility in displaying an image. In the pixel division method, however, even if the chromaticity is adjusted not to change depending on the gradation, that is, good chromaticity characteristics maintaining a color balance are obtained in an almost whole gradation range when a screen of the liquid crystal display device is viewed from a front direction, the chromaticity still changes depending on gradation values in a certain range of halftone when the screen is viewed from a oblique direction, as shown in FIG. 10. As a result, even in a case where the gradation value is changed such that each of the three primary colors, R, G, and B is mutually the same, that is, even in a case where the gradation value is changed such that the screen exhibits an achromatic color when viewed from the front direction as shown in (A) of FIG. 17, there is caused a phenomenon that the screen is tinged with yellow in a certain range of the halftone when the screen is viewed in the oblique direction, as shown in (B) of FIG. 17. This means that the good color reproducibility can not be obtained when the screen is viewed in the oblique direction.

Accordingly, an object of the present invention is to provide a color liquid crystal display device which can display an image having a high color reproducibility when viewed from an oblique direction as well as from a front direction of a screen thereof, while improving the viewing angle dependence of the γ-characteristics by employing the pixel division method.

Measures for Solving the Problems

In a first aspect of the present invention, there is provided a color liquid crystal display device, employing a pixel division method in which each pixel of an image displayed in a predetermined screen is configured with a predetermined number of two or more sub-pixels obtained by spatial or temporal division of one pixel in a predetermined division ratio, the device comprising:

a plurality of pixel formation portions provided correspondingly to respective pixels of the image, each of the portions forming a pixel of any of primary colors for color display with the predetermined number of sub-pixels;

a drive circuit for providing each of the pixel formation portions with applied voltages respectively corresponding to the sub-pixels composing the pixel to be formed by that pixel formation portion, based on a gradation value indicated by an input signal provided from outside as a video signal representing the image; and a gamma correction part for correcting a relationship between a gradation value indicated by the input signal and a luminance value of the pixel formed by the pixel formation portion according to the gradation value independently for each of the primary colors for color display, wherein each of the pixel formation portions forms the pixel by displaying the predetermined number of sub-pixels with luminance values different from one another based on the applied voltages, and wherein the gamma correction part corrects the relationship such that gradation dependence of chromaticity is suppressed when the screen is viewed from a front thereof, and also corrects the relationship in the vicinity of a predetermined gradation value, which is determined by the division ratio in the one pixel and differences in the applied voltage among the predetermined number of sub-pixels, such that the gradation dependence of the chromaticity is suppressed when the screen is viewed from a predetermined oblique direction.

In a second aspect of the present invention, there is provided the color liquid crystal display device according to the first aspect of the present invention, wherein the gamma correction part corrects the chromaticity when viewed from the front to be shifted from a state maintaining a color balance toward blue in the vicinity of the predetermined gradation value such that the gradation dependence of the chromaticity is suppressed when viewed from the oblique direction.

In a third aspect of the present invention, there is provided the color liquid crystal display device according to the first aspect of the present invention, wherein the gamma correction part corrects the relationship such that a curve representing the gradation dependence of the chromaticity when viewed from the front becomes approximately flat in a range except for the vicinity of the predetermined gradation value.

In a fourth aspect of the present invention, there is provided the color liquid crystal display device according to the first aspect of the present invention, wherein the gamma correction part corrects the relationship such that a curve representing the gradation dependence of the chromaticity when viewed from the front changes approximately monotonically with respect to the gradation value.

In a fifth aspect of the present invention, there is provided the color liquid crystal display device according to the first aspect of the present invention, wherein the gamma correction part includes a correction table associating a gradation value before correction with a gradation value after correction for each of the primary colors for color display in order to correct the relationship, and outputs the gradation value after correction associated with the gradation value indicated by the input signal referring to the correction table, and wherein the drive circuit provides each of the pixel formation portions with the applied voltage based on the gradation value after correction.

In a sixth aspect of the present invention, there is provided the color liquid crystal display device according to the first aspect of the present invention, further including a common electrode provided commonly at the plurality of pixel formation portions, each of the pixel formation portions including:

a first and a second sub-pixel electrodes disposed facing the common electrode so as to sandwich a liquid crystal layer inbetween;

a first auxiliary electrode disposed so as to form a first auxiliary capacitance between the first sub-pixel electrode and the same; and a second auxiliary electrode disposed so as to form a second auxiliary capacitance between the second sub-pixel electrode and the same, and the drive circuit including:

a pixel electrode drive circuit for providing a voltage according to the input signal to the first and second sub-pixel electrodes with the common electrode as a reference; and an auxiliary electrode drive circuit for applying voltages which are different from each other and changes in a predetermined period and a predetermined amplitude, to the first and second auxiliary electrodes, wherein the predetermined gradation value is determined by an area ratio of the first sub-pixel electrode to the second sub-pixel electrode and a difference in the applied voltage between the first auxiliary electrode and the second auxiliary electrode.

In a seventh aspect of the present invention, there is provided a gamma correction method for correcting a relationship between a gradation value indicated by an input signal provided from outside as a video signal representing an image and a luminance value of a pixel formed according to the gradation value, in a color liquid crystal display device employing a pixel division method in which each pixel of the image displayed on a predetermined screen is composed of a predetermined number of two or more sub-pixels obtained by spatial or temporal division of one pixel in a predetermined division ratio, the method including a correction step of correcting the relationship independently for each of primary colors for color display, wherein in the correction step, the relationship is corrected such that gradation dependence of chromaticity is suppressed when the screen is viewed from a front thereof, and the relationship in the vicinity of a predetermined gradation value is also corrected such that the gradation dependence of the chromaticity is suppressed when the screen is viewed from a predetermined oblique direction, the predetermined gradation value being determined by the division ratio in the one pixel and differences in a voltage applied to liquid crystal among the predetermined number of sub-pixels.

In an eighth aspect of the present invention, there is provided the gamma correction method according to the seventh aspect of the present invention, wherein in the correction step, the chromaticity when viewed from the front is corrected to shift from a state maintaining a color balance toward blue in the vicinity of the predetermined gradation value such that the gradation dependence of the chromaticity is suppressed when viewed from the oblique direction.

In a ninth aspect of the present invention, there is provided the gamma correction method according to the seventh aspect of the present invention, wherein in the correction step, the relationship is corrected such that a curve representing the gradation dependence of the chromaticity when viewed from the front becomes approximately flat in a range except for the vicinity of the predetermined gradation value.

In a tenth aspect of the present invention, there is provided the gamma correction method according to the seventh aspect of the present invention, wherein in the correction step, the relationship is corrected such that a curve representing the gradation dependence of the chromaticity when viewed from the front changes approximately monotonically with respect to the gradation value.

Advantages of the Invention

According to the first aspect of the present invention, an independent gamma correction is carried out such that the gradation dependence of the chromaticity is suppressed when the screen is viewed from the front of the screen (in the front view), and also the independent gamma correction is carried out in the vicinity of the predetermined gradation value, which is determined by the division ratio in one pixel and differences in the applied voltage among the predetermined number of sub-pixels in one pixel, such that the gradation dependence of the chromaticity is suppressed when the screen is viewed from a predetermined oblique direction (in the oblique view). Such an independent gamma correction suppresses color imbalance in the range of the halftone observed in the conventional color liquid crystal display device employing the pixel division method to such an extent that matters little for a human visual sense even in the oblique view, and there is obtained a situation in which the color balance is maintained substantially for the almost whole gradation range in the oblique view as well as in the front view (to the extent that matters little for a human visual sense). As a result, it is possible to display an image having a high color reproducibility when viewed from an oblique direction as well as when viewed from the front of the screen, while improving the viewing angle dependence of the γ-characteristics by the pixel division method.

According to the second aspect of the present invention, the independent gamma correction is carried out which shifts the chromaticity when the screen is viewed from the front, from the state maintaining the color balance toward blue in the vicinity of the predetermined gradation value such that the gradation dependence of the chromaticity is suppressed when viewed from the oblique direction. Such an independent gamma correction reduces the yellow tinge in the halftone caused by the color imbalance observed in the oblique view in the conventional color liquid crystal display device employing the pixel division method, and there is obtained a situation in which the color balance is maintained substantially for the almost whole gradation range in the oblique view as well as in the front view (to the extent that matters little for a human visual sense). As a result, it is possible to display an image having a high color reproducibility when the screen is viewed from an oblique direction as well as when viewed from the front of the screen.

According to the third aspect of the present invention, the independent gamma correction is carried out such that the gradation dependence of the chromaticity is suppressed in the oblique view in the vicinity of the predetermined gradation value, and also there is obtained a situation in which the color balance in the front view is maintained surely for the almost whole gradation values except for the vicinity of the predetermined gradation value. Accordingly, it is possible to display an image having a sufficiently high color reproducibility for the almost whole gradation range in the front view, while reducing the color imbalance (specifically, the yellow tinge in the halftone) observed in the oblique view in the conventional color liquid crystal display device employing the pixel division method.

According to the fourth aspect of the present invention, the independent gamma correction is carried out such that the gradation dependence of the chromaticity is suppressed in the oblique view in the vicinity of the predetermined gradation value, and also the independent gamma correction is carried out such that the curve representing the gradation dependence of the chromaticity in the front view changes approximately monotonically with respect to the gradation value. Accordingly, it is possible to make the chromaticity shift by a change of the gradation value not to cause a human sense of discomfort, while reducing the color imbalance (specifically, the yellow tinge in the halftone) observed in the oblique view in the conventional color liquid crystal display device employing the pixel division method.

According to the fifth aspect of the present invention, by correcting the gradation value indicated by the input signal with reference to the correction table for the gamma correction associating the gradation value before correction and the gradation value after correction with each other for each of the primary colors for color display, the gamma correction is carried out in the same manner as in the first aspect of the present invention, and thereby it is possible to display an image having a high color reproducibility in the oblique view as well as in the front view. Also, it is possible to adjust easily a correction amount in the independent gamma correction, by changing the contents of the correction table.

According to the sixth aspect of the present invention, applying voltages which are different from each other and change in a predetermined period and in a predetermined amplitude to the first and second sub-pixel electrodes provides luminance values different from each other to the sub-pixels in each of the pixel formation portions, and also the independent gamma correction is carried out such that the gradation dependence of the chromaticity is suppressed in the oblique view in the vicinity of the predetermined gradation value determined by the area ratio of the first sub-pixel electrode to the second sub-pixel electrode and the difference in the applied voltage between the first auxiliary electrode and the second auxiliary electrode. Thereby, it is possible to display an image having a high color reproducibility in the oblique view as well as in the front view, while realizing the pixel division method in a comparatively simple configuration to improve the viewing angle dependence of the γ characteristics.

The seventh to tenth aspects of the present invention have the same advantages as those of the first to the fourth aspects of the present invention.

DESCRIPTION OF THE REFERENCE SYMBOLS

Figure 1:
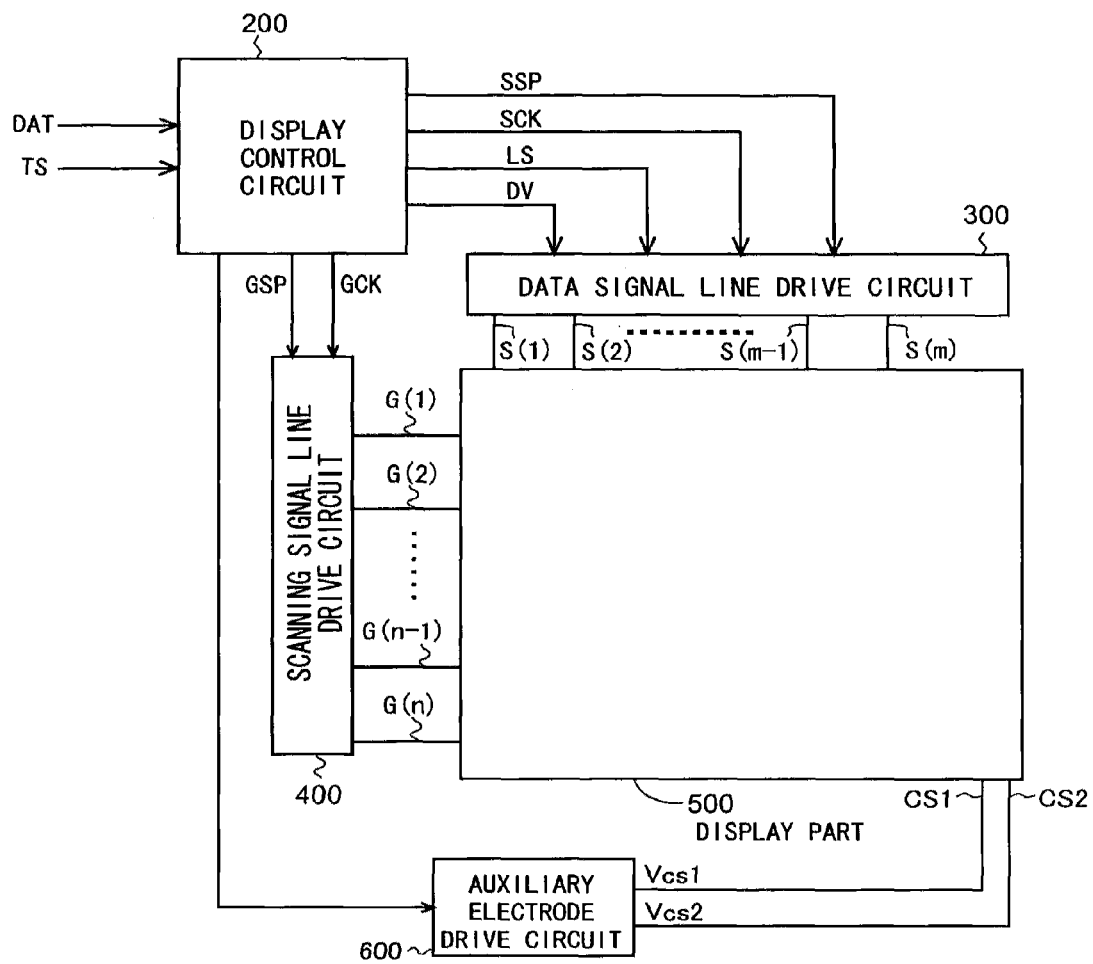
FIG. 1 is a block diagram illustrating a whole configuration of a color liquid crystal display device according to a first embodiment of the present invention.

10 Pixel formation portion
10a First sub-pixel formation portion
10b Second sub-pixel formation portion
12a First TFT (first thin film transistor)
12b Second TFT (second thin film transistor)
14a First sub-pixel electrode
14b Second sub-pixel electrode
16a First auxiliary electrode
16b Second auxiliary electrode
20 Gamma correction part
23 Gamma-correction processing part
21r R gamma-correction table
21g G gamma-correction table
21b B gamma-correction table
200 Display control circuit
300 Data-signal-line drive circuit
400 Scanning-signal-line drive circuit
500 Display part
Ccsa First auxiliary capacitance
Ccsb Second auxiliary capacitance
Ecom Common electrode
Vcs1 First auxiliary electrode voltage
Vcs2 Second auxiliary electrode voltage
Vcom Common electrode voltage
Vda First sub-pixel voltage
Vdb Second sub-pixel voltage
CS1 First auxiliary capacitance line
CS2 Second auxiliary capacitance line
G(i) Scanning signal line (i=1 to n)
S(j) Data signal line (j=1 to m)
Vg Gate signal voltage
Vs Data signal voltage
Lr, Lg, Lb Gradation signal (before correction)
Lmr, Lmg, Lmb Gradation signal (after correction)
IL Oblique hue correction range (oblique color imbalance range)

BEST MODES FOR CARRYING OUT THE INVENTION

Hereinafter, embodiments of the present invention will be described with reference to the accompanying drawings. The following description assumes that a display part employs a vertical alignment mode and is configured to provide a normally black display. Here, a drive method thereof may be a line-inversion drive method in which a voltage applied to liquid crystal is inverted every frame period and also every one or a predetermined number of scanning signal lines, or a dot-inversion drive method in which the voltage applied to the liquid crystal is inverted every frame period and also every scanning signal line and video signal line.

1. First Embodiment 1.1 Whole Configuration of a Liquid Crystal Display Device

Figure 2:
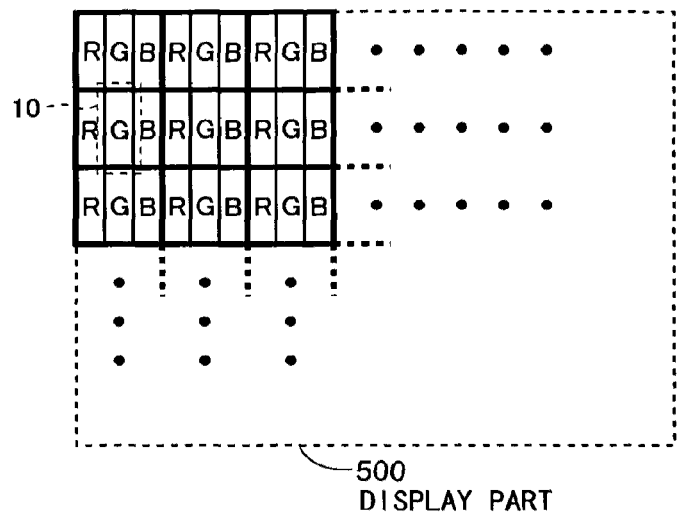
FIG. 2 is a schematic diagram illustrating a configuration of a display part in the first embodiment FIG. 3 consists of a schematic diagram (A) and an equivalent circuit diagram (B) respectively illustrating an electrical configuration of a pixel formation portion in the display part of the first embodiment.

FIG. 1 is a block diagram illustrating a whole configuration of an active-matrix liquid crystal display device according to a first embodiment of the present invention. This liquid crystal display device is provided with: a display control circuit 200; a pixel electrode drive circuit including a data-signal-line drive circuit (also called "source driver")-300, a scanning-signal-line drive circuit (also called "gate driver") 400, and a common electrode drive circuit (not shown in the drawing); an auxiliary electrode drive circuit 600; and a display part 500. The display part 500 includes a plurality of (m) data signal lines S(1) to S(m), a plurality of (n) scanning signal lines G(1) to G(n), and a plurality of (m×n) pixel formation portions provided correspondingly to respective intersections of the plurality of data signal lines S(1) to S(m) and the plurality of scanning signal lines G(1) to G(n). These pixel formation portions include three kinds of pixel formation portions corresponding to the three primary colors for displaying a color image, that is, an R pixel formation portion forming an R (red) pixel, a G pixel formation portion forming a G (green) pixel, and a B pixel formation portion forming a B (blue) pixel. Three pixel formations 10 of R pixel formation portion, G pixel formation portion and G pixel formation portion, neighboring in a horizontal direction as shown in FIG. 2, constitute one of units of display, which are arranged in a matrix on the display part 500.

Figure 3:
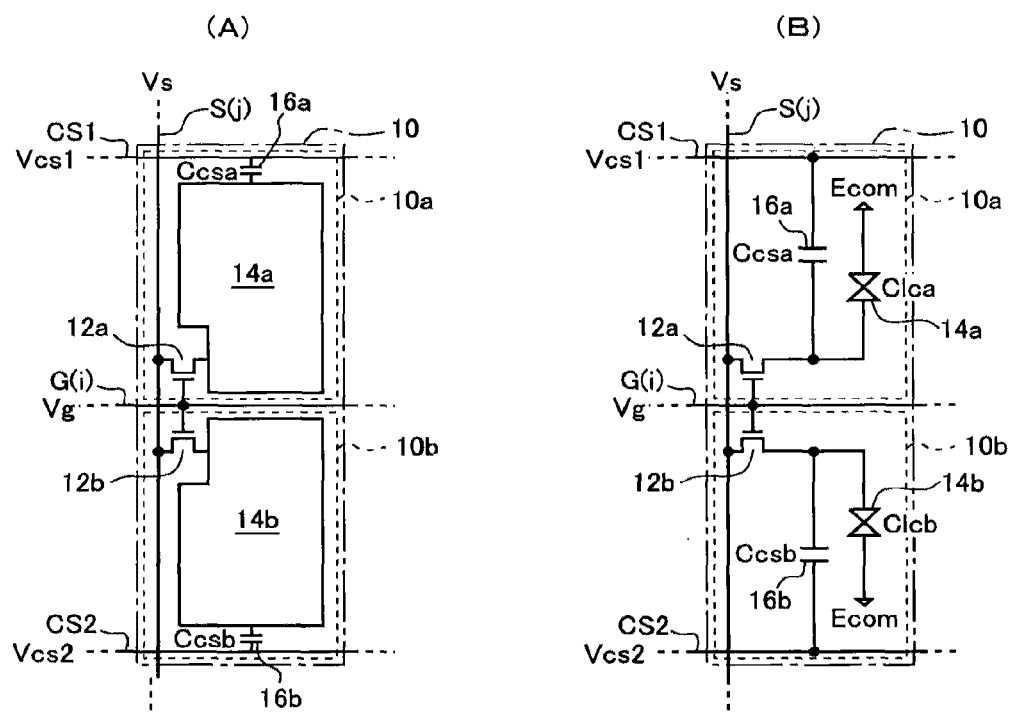

The present embodiment employs the pixel division method for improving a viewing angle dependence of display characteristics, and each pixel formation portion 10 in the display part 500 is configured as shown in (A) and (B) of FIG. 3. Here, (A) of FIG. 3 is a schematic diagram showing an electrical configuration of one pixel formation portion in the display part 500 and (B) of FIG. 3 is an equivalent circuit diagram showing the electrical configuration in the pixel formation portion. As shown in these (A) and (B) of FIG. 3, each pixel formation portion 10 includes a first and a second sub-pixel formation portions 10a and 10b having sub-pixel electrodes 14a and 14b independent from each other, respectively, and an average of a luminance value of a sub-pixel formed by the first sub-pixel formation portion 10a and a luminance value of a sub-pixel formed by the second sub-pixel formation portion 10b becomes a luminance value of a pixel formed by the pixel formation portion 10.

In each of the pixel formation portion 10, the first sub-pixel formation portion 10a includes a first TFT 12a, the gate terminal of which is connected to a scanning signal line G(i) passing through an intersection corresponding to the pixel formation portion 10 and the source terminal of which is connected to a data signal line S(j) passing through the intersection, a first sub-pixel electrode 14a connected to the drain terminal of the first TFT 12a, and a first auxiliary electrode 16a disposed so as to form a first auxiliary capacitance Ccsa between the first sub-pixel electrode 14a and the same. Also, the second sub-pixel formation portion 10b includes a second TFT 12b, the gate terminal of which is connected to the scanning signal line G(i) passing through the intersection and the source terminal of which is connected to the data signal line S(j) passing through the intersection, a second sub-pixel electrode 14b connected to a drain terminal of the second TFT 12b, and a second auxiliary electrode 16b disposed so as to form a second auxiliary capacitance Ccsb between the second sub-pixel electrode 14b and the same. Further, each of the pixel formation portion 10 includes a liquid crystal layer as an electro-optical element provided commonly at all the pixel formation portions 10 and sandwiched between a common electrode Ecom provided commonly at all the pixel formation portions 10 and the first and second sub-pixel electrodes. A first liquid crystal capacitance Clca is formed by the first sub-pixel electrode 14a, the common electrode Ecom and the liquid crystal layer sandwiched therebetween, and a second liquid crystal capacitance Clcb is formed by the second sub-pixel electrode 14b, the common electrode Ecom and the liquid crystal layer sandwiched therebetween. Hereinafter, a sum of the first liquid crystal capacitance Clca and the first auxiliary capacitance Ccsa is referred to as a "first sub-pixel capacitance" and designated by a symbol "Cpa", and a sum of the second liquid crystal capacitance Clcb and the second auxiliary capacitance Ccsb is referred to as a "second sub-pixel capacitance" and designated by a symbol "Cpb". Capacitance values of these capacitances Clca, Clcb, Ccsa, Ccsb, Cpa and Cpb are also designated by the same symbols Clca, Clcb, Ccsa, Ccsb, Cpa and Cpb.

As shown in (A) and (B) FIG. 3, in the display part 500 there are disposed a first auxiliary capacitance line CS1 and a second auxiliary capacitance line CS2 in parallel to the scanning signal line G(i) so as to sandwich each of the pixel formation portion 10 in addition to the foregoing data signal lines S(1) to S(m) and scanning signal lines G(1) to G(n), and the first auxiliary capacitance line CS1 is disposed on one side of each pixel formation portion 10 (upper side of (A) and (B) of FIG. 3) and the second auxiliary capacitance line CS2 is disposed on the other side of each pixel formation portion 10 (lower side of (A) and (B) of FIG. 3). The first auxiliary capacitance line CS1 is connected to the auxiliary electrode 16a of the first sub-pixel formation portion 10a and the second auxiliary capacitance line CS2 is connected to the auxiliary electrode 16b of the second sub-pixel formation portion 10b in each pixel formation portion 10. Accordingly, the first sub-pixel electrode 14a is connected to the data signal line S (j) via the first TFT 12a and also connected to the first auxiliary capacitance line CS1 via the first auxiliary capacitance Ccsa, and the second sub-pixel electrode 14b is connected to the data signal line S (j) via the second TFT 12b and also connected to the second auxiliary capacitance line CS2 via the second auxiliary capacitance Ccsb.

As shown in FIG. 1, the display control circuit 200 receives a data signal DAT and a timing control signal TS transmitted from outside and outputs a digital image signal DV, a source start pulse signal SSP, a source clock signal SCK, a latch strobe signal LS, a gate start pulse signal GSP, a gate clock signal GCK, etc. The digital image signal DV is a signal representing an image to be displayed on the display part 500, and the source start pulse signal SSP, source clock signal SCK, latch strobe signal LS, gate start pulse signal GSP, gate clock signal GCK, etc. are timing signals for controlling timings for displaying the image on the display part 500.

The data-signal-line drive circuit 300 receives the digital image signal DV, the source start pulse signal SSP, source clock signal SCK and latch strobe signal LS outputted from the display control circuit 200, and applies the data signal to each of the data signal lines S (1) to S (m) for charging the first sub-pixel capacitance Cpa (=Clca+Ccsa) and the second sub-pixel capacitance Cpb (=Clcb+Ccsb) in each pixel formation portion 10 of the display part 500. At this time, the data signal-line drive circuit 300 holds sequentially the digital image signal DV exhibiting voltages to be applied to data signal lines S (1) to S (m), respectively, at each timing when a pulse of the source clock signal SCK is generated. Then, the held digital image signal DV is converted into analog voltages at a timing when a pulse of the latch strobe signal LS is generated, and the analog voltages are applied to all the data signal lines S (1) to S (m), respectively as data signal voltages, at the same time.

The scanning-signal-line drive circuit 400 applies active scanning signals (scanning signal voltages Vg (=VgH) to switch on the first TFT 12a and the second TFT 12b) sequentially to the scanning signal lines G (1) to G (n) based on the gate start pulse signal GSP and the gate clock signal GCK outputted from the display control circuit 200.

The auxiliary electrode drive circuit 600 generates a first auxiliary electrode voltage Vcs1 and a second auxiliary electrode voltage Vcs2 based on the timing signal provided from the display control circuit 200, and applies these voltages Vcs1 and Vcs2 to the first auxiliary capacitance line CS1 and the second auxiliary capacitance line CS2 of the display part 500, respectively.

The common electrode drive circuit (not shown in the drawing) applies a predetermined voltage to the common electrode Ecom as a common electrode voltage Vcom. In the present embodiment, the common electrode voltage Vcom is assumed to be a fixed voltage.

1.2 Operation of the Liquid Crystal Display Device

Figure 4:
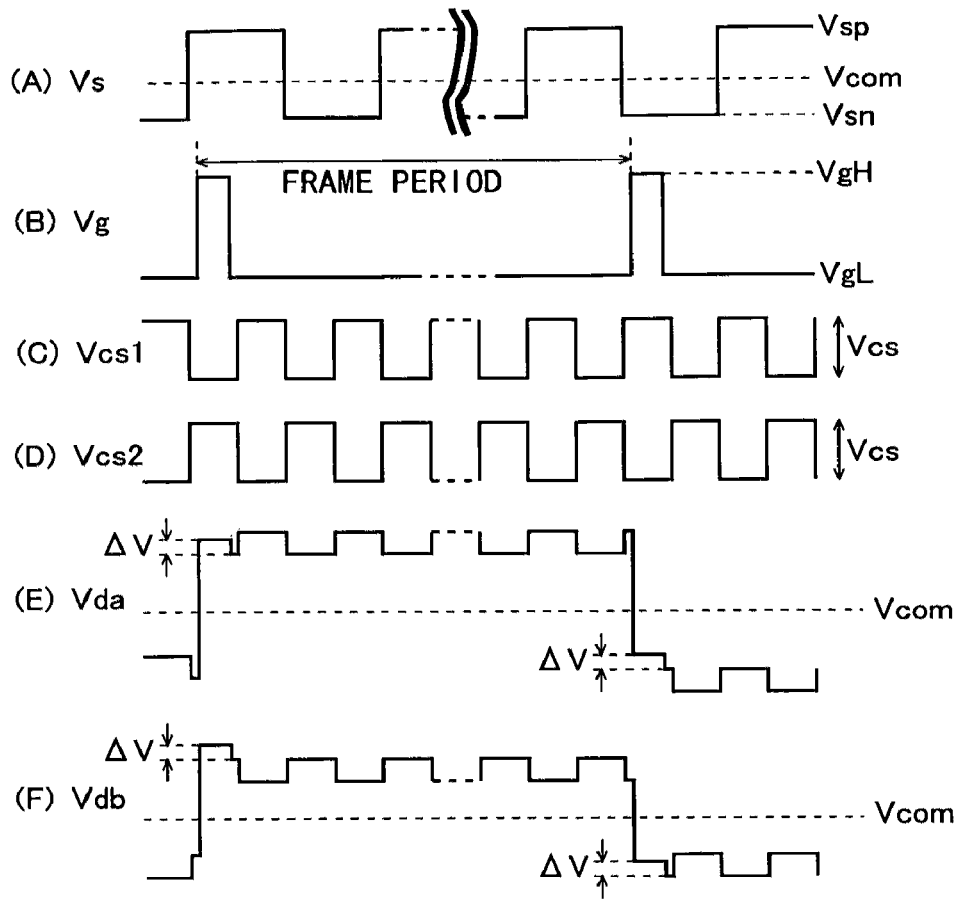
FIG. 4 consists of signal waveform charts (A to F) for illustrating operation of the liquid crystal display device according to the embodiment.

Operation of the liquid crystal display device configured as described above according to the present embodiment will be described with reference to signal waveform charts shown in FIG. 4.

Now attention is focused on the pixel formation portion 10 composed of the first sub-pixel formation portion 10a and the second sub-pixel formation portion 10b shown in (A) and (B) of FIG. 3. A data signal voltage Vs as shown in (A) of FIG. 4 is applied to the data signal line corresponding to this pixel formation portion 10 (hereinbelow, referred to as "corresponding data signal line") S (j), and the scanning signal voltage Vg as shown in (B) of FIG. 4 is applied to the scanning signal line corresponding to this pixel formation portion 10 (hereinbelow, referred to as "corresponding scanning signal line") G (i). Meanwhile, to the first auxiliary capacitance line CS1 is applied a periodically varying voltage having a rectangular waveform with an amplitude of Vcs as shown in (C) of FIG. 4, as a first auxiliary electrode voltage Vcs1, and to the second auxiliary capacitance line CS2 is applied a periodically varying voltage having a rectangular waveform with the amplitude of Vcs as shown in (D) of FIG. 4 as a second auxiliary electrode voltage Vcs2. Here, the first auxiliary electrode voltage Vcs1 and the second auxiliary electrode voltage Vcs2 have the same amplitude and phases different from each other by 180 degrees.

When the data signal voltage Vs, scanning signal voltage Vg, and the first and second auxiliary electrode voltages Vcs1 and Vcs2 described above are applied by the data-signal-line drive circuit 300, scanning-signal-line drive circuit 400 and auxiliary electrode drive circuit 600, a voltage of the first sub-pixel electrode 14a (hereinbelow, referred to as "first sub-pixel voltage") Vda and a voltage of the second sub-pixel electrode 14b (hereinbelow, referred to as "second sub-pixel voltage") Vdb change as follows. That is, when the scanning signal voltage Vg changes from an off voltage VgL to an on voltage VgH (corresponding scanning signal line G (i) is selected), the first TFT T12a and the second TFT 12b are changed from an off state to an on state, and the data signal voltage Vs (voltage of positive polarity with reference to the common electrode voltage Vcom) at this timing is applied to the first sub-pixel electrode 14a via the first TFT 12a and the second sub-pixel electrode 14b via the second TFT 12b. Thereby, both of the first and second sub-pixel voltages Vda and Vdb become equal to the data signal voltage Vs. Then, when the scanning signal voltage Vg changes to the off voltage VgL (corresponding scanning signal line G (i) becomes a non-selected state), both of the first TFT 12a and the second TFT 12b are changed from the on state to the off state. At this time, the change of the scanning signal voltage Vg (VgH to VgL) provides an effect to the first and second sub-pixel voltages Vda and Vdb and reduces these voltages Vda and Vdb via parasitic capacitances Cgd between the gates and the drains of the first and second TFTs 12a and 12b. This phenomenon is called a "pull-in phenomenon" and a voltage reduction in this case ΔV is called a "pull-in voltage" (ΔV>0).

Subsequently, the first auxiliary electrode voltage Vcs1 is increased by the amplitude of Vcs and the second auxiliary electrode voltage Vcs2 is decreased by the amplitude of Vcs ((C) and (D) of FIG. 4). Then, the first and second auxiliary electrode voltages Vcs1 and Vcs2 repeat alternately the increase and decrease by the amplitude Vcs in the predetermined period until the scanning signal voltage Vg is changed next to the on voltage VgH (until the corresponding scanning signal line G (i) is selected). Note that the first and second auxiliary electrode voltages Vcs1 and Vcs2 have phases different from each other by 180 degrees. While the scanning signal line voltage Vg is the off voltage (while the corresponding scanning signal line G (i) is in the non-selected state and the first and second TFTs 12a and 12b are in the off state), the first sub-pixel voltage Vda is affected by the periodic change of the first auxiliary electrode voltage Vcs1 via the first auxiliary capacitance Ccsa and changes as shown in (E) of FIG. 4, and the second sub-pixel voltage Vdb is affected by the periodic change of the second auxiliary electrode voltage Vcs2 via the second auxiliary capacitance Ccsb and changes as shown in (F) of FIG. 4.

When the scanning signal line voltage Vg is changed next to the on voltage VgH, the data signal voltage Vs (voltage of negative polarity with reference to the common electrode voltage Vcom) at this timing is applied to the first sub-pixel electrode 14a via the first TFT 12a and the second sub-pixel electrode 14b via the second TFT 12b. Then, when the scanning signal voltage Vg is changed to the off voltage VgL, both of the first TFT 12a and the second TFT 12b go into the off state. At this time, by the pull-in phenomenon caused by the parasitic capacitances Cgd between the gates and drains of the first and second TFTs 12a and 12b, the first and second sub-pixel voltages Vda and Vdb, which are voltages of negative polarity, are reduced by about ΔV (ΔV>0). After that, in the same manner as above, the first and second auxiliary electrode voltages Vcs1 and Vcs2 repeat alternately the increase and decrease by the amplitude Vcs in the predetermined period until the scanning signal voltage Vg is changed next to the on voltage VgH. Thereby, the first sub-pixel voltage Vda is affected by the periodic change of the first auxiliary electrode voltage Vcs1 via the first auxiliary capacitance Ccsa and changes as shown in (E) of FIG. 4, and the second sub-pixel voltage Vdb is affected by the periodic change of the second auxiliary electrode voltage Vcs2 via the second auxiliary capacitance Ccsb and changes as shown in (F) of FIG. 4.

Here, when the data signal line voltage Vs is designated by Vsp in the positive polarity and designated by Vsn in the negative polarity, an effective value Vlca_rms of an applied voltage to the liquid crystal (hereinbelow referred to as a "first sub-pixel liquid crystal voltage") in the first sub-pixel formation portion 10a is provided as follows according to (E) of FIG. 4, $$Vlca\_rms = Vsp - \Delta V + (1/2)Vcs(Ccsa/Cpa) - Vcom \quad (1)$$

and an effective value Vlcb_rms of an applied voltage to the liquid crystal (hereinbelow referred to as a "second sub-pixel liquid crystal voltage") in the second sub-pixel formation portion 10b is provided as follows according to (F) of FIG. 4, $$Vlcb\_rms = Vsp - \Delta V - (1/2)Vcs(Ccsb/Cpb) - Vcom \quad (2)$$

From the equations (1) and (2), the effective value of the first sub-pixel liquid crystal voltage Vlca_rms is larger than that of the second sub-pixel liquid crystal voltage Vlcb_rms. Further, when the first and second liquid crystal capacitances Clca and Clcb are assumed to be approximately the same as each other and also the first and second auxiliary capacitances Ccsa and Ccsb are assumed to be the same as each other (Clca=Clcb and Ccsa=Ccsb), and thereby Cp=Cpa=Cpb is assumed, a difference between the effective value of the first sub-pixel liquid crystal voltage Vlca_rms and the effective value of the second sub-pixel liquid crystal voltage Vlcb_rms, ΔVlc=Vlca_rms−Vlcb_rms, becomes $$\Delta Vlc = Vcs(Ccs/Cp) \quad (3)$$

Therefore, the difference ΔVlc between the effective value of the first sub-pixel liquid crystal voltage Vlca_rms and the effective value of the second sub-pixel liquid crystal voltage Vlcb_rms is proportional to the amplitude of the auxiliary electrode voltage Vcs and can be controlled by this amplitude Vcs.

Figure 5:
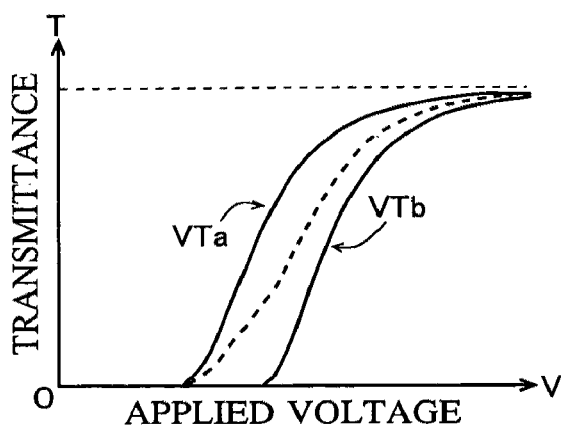
FIG. 5 is a characteristic diagram showing VT characteristics (applied voltage-transmittance characteristics) in a liquid crystal display device employing the pixel division method.

In the pixel division method described above, the effective value of the first sub-pixel liquid crystal voltage Vlca_rms becomes higher and the effective value of the second sub-pixel liquid crystal voltage Vlcb_rms becomes lower than an apparent applied voltage onto the liquid crystal in the pixel formation portion 10, Vlc_ap=Vsp−ΔV−Vcom. Therefore, a relationship between the apparent applied voltage V=Vlc_ap and transmittance T (VT characteristics) becomes as shown in FIG. 5. That is, the VT characteristics of the first sub-pixel formation portion 10*a* becomes as shown by a characteristic curve VTa and the VT characteristics of the second sub-pixel formation portion 10*b* becomes as shown by a characteristic curve VTb. Further, the VT characteristics of the pixel formation portion 10 become average characteristics provided by these VT characteristics curves VTa and VTb, that is, characteristics as shown by a dotted line in FIG. 5.

In the present embodiment, when voltages according to the data signal DAT (gradation values thereof), which is the input signal from outside, are applied to the liquid crystal in the first and second sub-pixel formation portions 10*a* and 10*b*, the light transmittance is controlled according to the above described VT characteristics in each of the pixel formation portions 10 of the display part 500, and thereby an image exhibited by the data signal DAT of the input signal is displayed. Further, by employing the pixel division method as described above, the viewing angle dependence of the γ-characteristics is improved in the liquid crystal display device.

1.3 Color Tracking and Independent Gamma Correction

Figure 6:
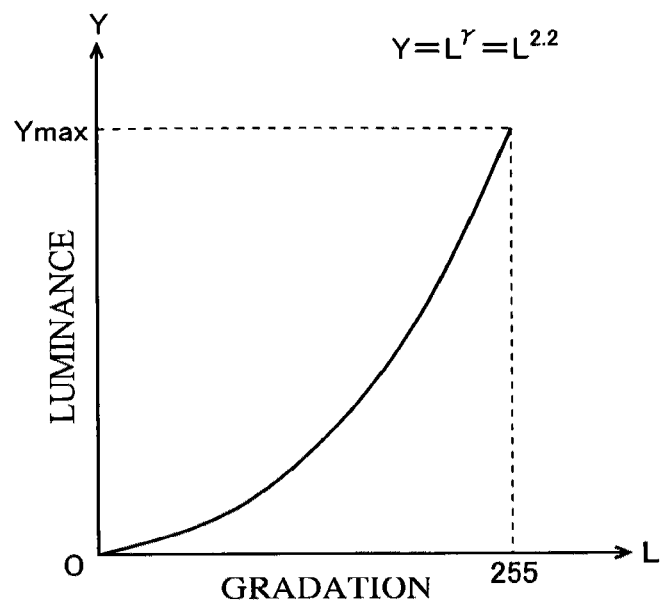
FIG. 6 is a characteristic diagram showing an example of γ-characteristics.

A video signal such as a television signal or the like assumes the γ-characteristics of a CRT (Cathode Ray Tube) display device, that is, γ-characteristics as shown in FIG. 6. Accordingly, to reproduce (display) an image having a good gradation from such a video signal in the liquid crystal display device, a gradation value or the like indicated by the input signal needs to be corrected according to the VT characteristics of the liquid crystal display device (refer to, e.g., FIG. 5), such that the relationship between the gradation value indicated by the input video signal and a luminance value of an image to be displayed, that is, γ-characteristics of the liquid crystal display device becomes the γ-characteristics as shown in FIG. 6. Such gamma correction methods include a method to correct a gradation value indicated by the input signal using a lookup table as a correction table, and a method to adjust a voltage division ratio in a voltage division circuit (gradation voltage generation circuit) for generating a gradation voltage to be used in generation of the data signal voltage Vs (refer to, e.g., Japanese Unexamined Patent Application Publication No. 2002-258813 (patent reference 1) and Japanese Unexamined Patent Application Publication No. 2001-222264 (patent reference 2)).

Figure 7:
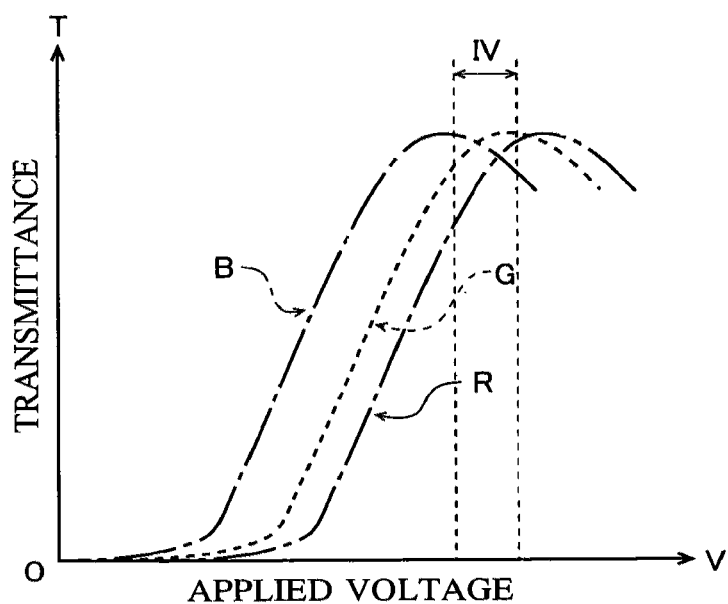
FIG. 7 is a characteristic diagram showing different VT characteristics for different colors of a pixel in the liquid crystal display device.
Figure 9:
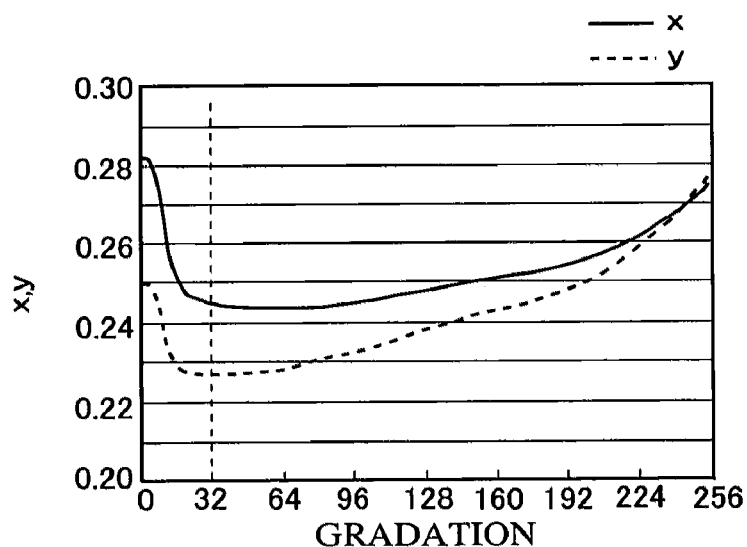
FIG. 9 is a characteristic diagram for illustrating gradation dependence of chromaticity in the liquid crystal display device employing the pixel division method.

The display part of the color liquid crystal display device includes three kinds of the pixel formation portions, R, G, and B pixel formation portions, as shown in FIG. 2. Generally, the VT characteristics (applied voltage-transmittance characteristics) of the color liquid crystal display device are different slightly among these three kinds of the pixel formation portions as shown in FIG. 7. Therefore, in a case without the independent gamma correction, when a video signal exhibiting achromatic gradation values (monochrome signal) is inputted to the color liquid crystal display device and the gradation value of the monochrome signal is changed, the chromaticity of the displayed image changes considerably against the gradation as shown in FIG. 9 (hereinbelow, a curve representing a gradation dependence of the chromaticity of a displayed image obtained when a video signal exhibiting such achromatic gradation values is inputted is referred to as a "color tracking curve"). Here, x and y of vertical axes in FIG. 9 are x-y coordinates in the XYZ colorimetric system introduced by the CIE (Commission Internationale de l'Eclairirange) (same in FIG. 10, FIG. 11, and FIG. 16 to be referred to hereinbelow).

This FIG. 9 shows that the chromaticity changes toward blue as a gradation value is reduced from 255 in a displayed image of the color liquid crystal display device. In this manner, the chromaticity changes considerably and satisfactory chromaticity characteristics are not obtained, although a video signal exhibiting achromatic gradation values is inputted.

Figure 10:
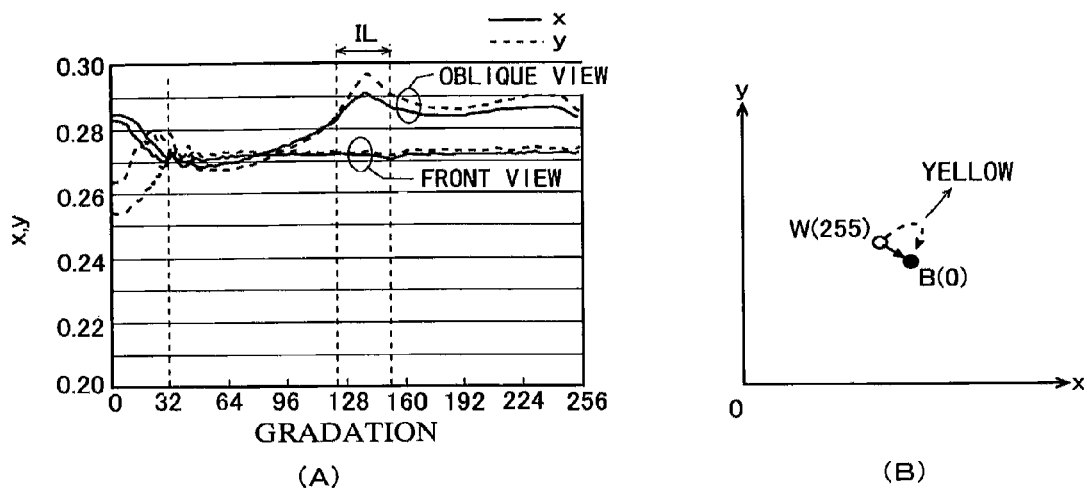
FIG. 10 consists of a characteristic diagram (A) and a chromaticity diagram (B) respectively for illustrating a problem in adjusting a color balance to obtain a good color tracking in the liquid crystal display device employing the pixel division method.

Accordingly the independent gamma correction is carried out such that the color balance in the front view does not change against the gradation, and thereby flat chromaticity characteristics are obtained against the gradation as shown in (A) of FIG. 10. In an example shown in (A) of FIG. 10, gradation values of 0 to 255 are allotted to each R, G, and B (gradation display with eight bits each).

Note that in the present embodiment, the chromaticity characteristics are adjusted to become flat in a gradation range of 32 to 255. This is because there is a limit to a range where the chromaticity can be corrected by the R, G, and B independent gamma correction of the liquid crystal while suppressing a black luminance, since the chromaticity in a gradation near black is determined by a light leak in polarizer plates in the cross-nicol state and a color filter (CF). Accordingly, in the present embodiment, the R, G, and B independent gamma correction is carried out such that the chromaticity comes gradually close to the chromaticity of black (zero gradation value) in a range below a gradation value of 32 as shown in (A) of FIG. 10. Thereby, the color balance can be maintained in the gradation value range of 32 to 255, when the screen of the liquid crystal display device is viewed from the front (in the front view).

Figure 8:
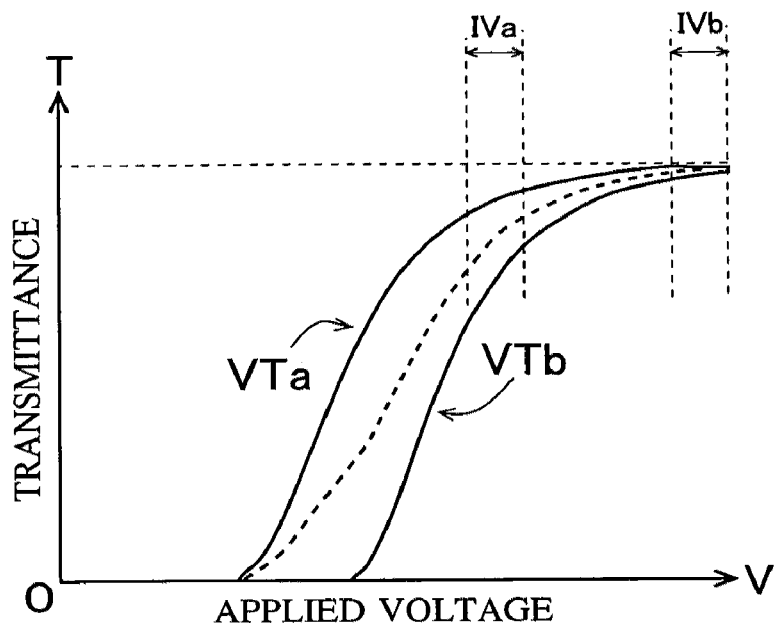
FIG. 8 is a VT characteristic diagram for illustrating a problem in association with color-reproducibility in the liquid crystal display device employing the pixel division method.

In the color liquid crystal display device employing the pixel division method such as the present embodiment, a luminance value of a pixel (any of R, G, and B pixels) formed by each pixel formation portion 10 is determined by a transmittance value based on the average characteristic curve (characteristic curve shown by a dotted line in FIG. 8) of the characteristic curves VTa and VTb which represent the VT characteristics of the first and second sub-pixel formation portions 10*a* and 10*b* composing the pixel formation portion 10 as shown in FIG. 8. That is, light flux of each pixel formation portion 10 is a sum of a light flux of the first sub-pixel formation portion 10a and a light flux of the second sub-pixel formation portion 10b which are determined by the transmittance values based on the above described two characteristic curves VTa and VTb, respectively. Therefore, in the pixel division method, blue transmittance decreases and the color balance breaks in two voltage ranges IVa and IVb as shown in FIG. 8, since the blue transmittance decreases at some gradient values as shown in FIG. 7.

Figure 17:
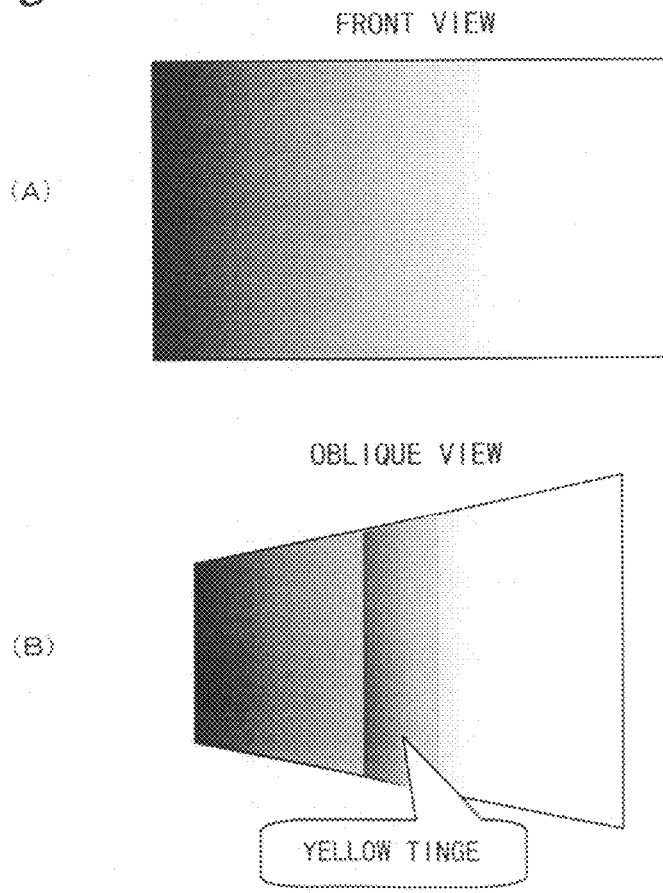
FIG. 17 consists of diagrams (A, B) for illustrating a problem in association with the color tracking (gradation dependence of the chromaticity) in the liquid crystal display device employing the pixel division method.

As described hereinabove, the retardation of the liquid crystal has a wavelength dependence and thereby VT characteristics are different among the three kinds of pixels R, G, and B and these differences are larger when a screen is viewed from the oblique direction (in the oblique view) than when viewed from the front (in the front view). Therefore, as shown in (A) of FIG. 10, even when a flat color tracking curve is obtained in the front view (in the gradation range of 32 to 255), a color imbalance range IL appears in the halftone in the oblique view. That is, when a video signal exhibiting the achromatic gradation values is inputted and the gradation value is changed from 0 to 255, a trajectory on the chromaticity diagram in the front view is obtained as shown by a solid line in (B) of FIG. 10 and a trajectory in the oblique view is obtained as shown by a dotted line in (B) of FIG. 10. This means that there is caused the yellow tinge in the color imbalance range IL of the halftone in the oblique view (refer to (B) of FIG. 17).

Figure 11:
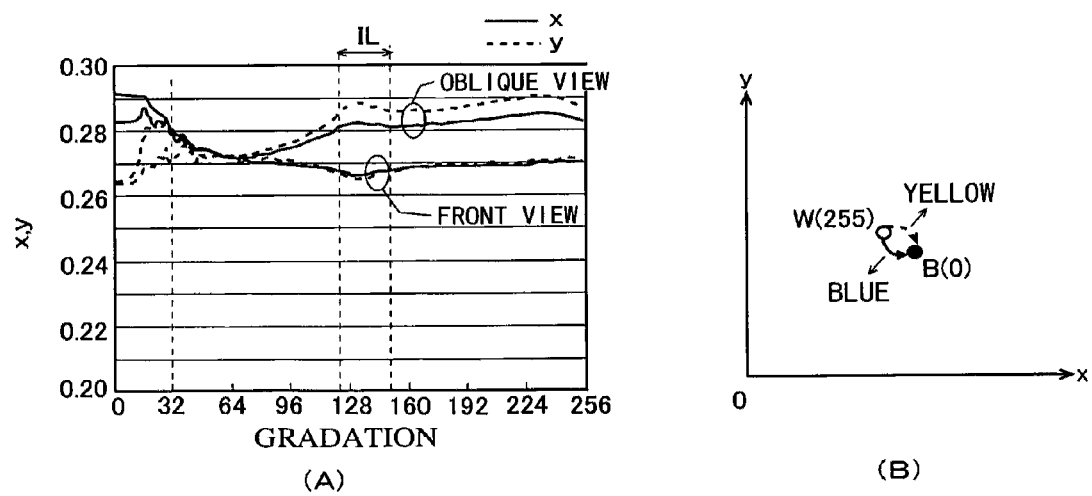
FIG. 11 consists of a characteristic diagram (A) and a chromaticity diagram (B) respectively for illustrating an independent gamma correction for obtaining the color tracking in the first embodiment.

Accordingly, in the present embodiment, the independent gamma correction is carried out such that chromaticity coordinate values x and y, which represent a chromaticity in the front view in the color imbalance range IL of the halftone, become slightly smaller than those of the state maintaining the color balance as shown in (A) of FIG. 11, when the video signal exhibiting the achromatic gradation values is input and the gradation value is changed. Thereby, in a color tracking curve in the oblique view, as shown in (A) of FIG. 11, the chromaticity coordinate values x and y are suppressed from increasing from those of the state maintaining the color balance in the color imbalance range IL. Note that the color balance is maintained in the gradation value range of 32 to 255 except for the color imbalance range IL. That is, the color tracking curve representing the gradation dependence of the chromaticity is flat in that range.

In such an independent gamma correction, the color tracking curve in the front view corresponds to a trajectory on the chromaticity diagram shown by a solid line in (B) of FIG. 11, and the color tracking curve in the oblique view corresponds to a trajectory on the chromaticity diagram shown by a dotted line in (B) of FIG. 11. As apparent from these trajectories, in the independent gamma correction of the present embodiment, the chromaticity in the front view is shifted toward blue in the color imbalance range IL of the halftone, and thereby the yellow tinge in the oblique view can be reduced. Here, the shift amount toward blue in the front view in the color imbalance range IL (reduced amounts of the chromaticity coordinates x and y) is determined such that the blue tinge does matter little for a human visual sense in the front view and also the yellow tinge does matter little for the human visual sense in the oblique view (hereinbelow, such color balance adjustment is referred to as "oblique color imbalance correction"). Note that, here, an angle (acute angle) formed by the normal line of a screen and a visual axis of a screen viewer is referred to as a "viewing angle". In the present embodiment, viewing the screen from an oblique direction of 45 degrees (a viewing angle of 45 degrees) is referred to as "the oblique view", but viewing the screen from an oblique direction of another angle, for example, 60 degrees may also be referred to as "the oblique view".

To carry out the independent gamma correction for obtaining the color tracking curve as described above ((A) of FIG. 11) in the present embodiment, it is necessary to specify the color imbalance range IL of the halftone as a range where the oblique color imbalance correction is carried out (hereinbelow, this range is referred to as an "oblique hue correction range). This oblique hue correction range IL appears due to employment of the pixel division method, and a position thereof (gradation value breaking the color balance) depends on the pixel division ratio and the difference in the effective value of the liquid crystal voltage $\Delta Vlc=Vcs(Ccs/Cp)$ between the effective value of the first sub-pixel liquid crystal voltage $Vlca\_rms$ and the effective value of the second sub-pixel liquid crystal voltage $Vlcb\_rms$. That is, in the present embodiment, the position depends on the area ratio of the first sub-pixel electrode 14a to the second sub-pixel electrode 14b in each pixel formation portion 10 and the amplitude Vcs of the first and second auxiliary electrode voltages Vcs1 and Vcs2. Hereinbelow, this point will be described with reference to FIGS. 12 and 13.

Figure 12:
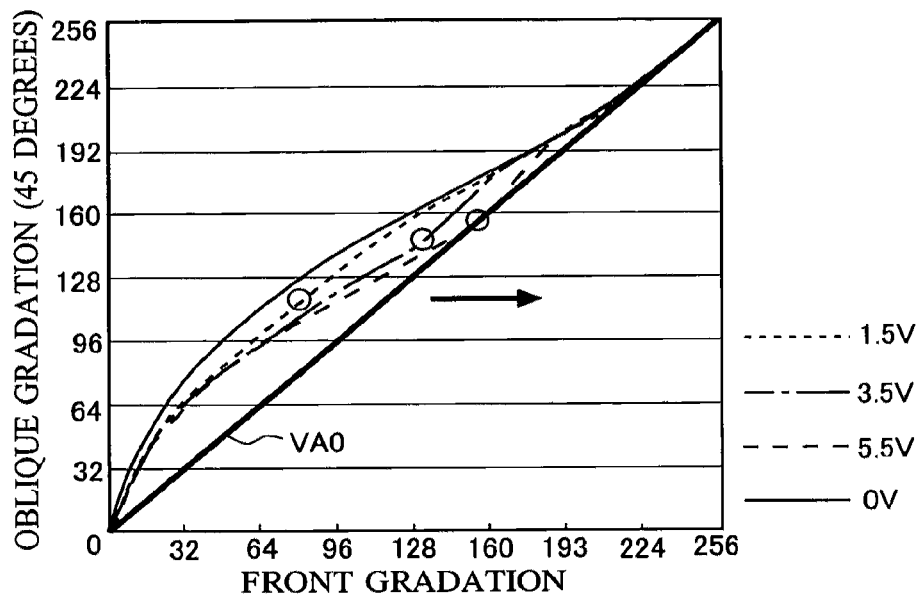
FIG. 12 is a characteristic diagram showing a state in which a viewing angle dependence of the gamma characteristics changes according to the amplitude of an auxiliary capacitance line voltage in the liquid crystal display device employing the pixel division method.

FIG. 12 is a characteristic diagram showing how the viewing angle dependence of the γ-characteristics changes according to the amplitude of the auxiliary capacitance line voltage in the liquid crystal display device employing the pixel division method. Specifically, this characteristic diagram shows a relationship between a gradation value in the front view (hereinbelow, referred to as "front gradation") and a gradation value in the oblique view (hereinbelow, referred to as "oblique gradation"), when an image with the gradation is displayed on the screen. A curve representing this relationship is referred to as a "viewing angle dependence curve" and the horizontal axis thereof represents the front gradation calculated from $$255\times(\text{front viewing angle normalized transmittance ratio}/100)^{(1/2.2)} \quad (4)$$

and the vertical axis thereof represents the oblique gradation calculated from $$255\times(\text{right 45 degree front viewing angle normalized transmittance ratio}/100)^{(1/2.2)} \quad (5)$$

Also, FIG. 12 shows a straight bold line with a gradient of 1 as a reference line VAO, and, as the viewing angle dependence curves come closer to this reference line VAO, a difference between the front gradation and the oblique gradation becomes smaller and the viewing angle dependence of the γ-characteristics becomes smaller. In a case where the display part 500 employs the vertical alignment mode and is configured to have the normally black display, the γ-characteristics are different between in the front view and in the oblique view, and an image becomes to show so called "white floating" in the oblique view, which is not observed in the front view. However, by the configuration in which each pixel is composed of a relatively bright sub-pixel and a relatively dark sub-pixel, that is, by employment of the pixel division method, the "white floating" in the oblique view is reduced and the viewing angle dependence is improved.

FIG. 12 shows four viewing angle dependence curves in a case where the pixel division ratio is 1:1, that is, in a case where an area ratio of the first sub-pixel electrode 14a to the second sub-pixel electrode 14b is 1:1. A solid line shows a viewing angle dependence curve when the amplitude of the first and second auxiliary electrode voltages Vcs1 and Vcs2 (hereinbelow, referred to as "CS amplitude") Vcs is zero volt, a dotted line shows a viewing angle dependence curve when the CS amplitude Vcs is 1.5 V, a dashed-dotted line shows a viewing angle dependence curve when the CS amplitude Vcs is 3.5 V, and a broken line shows a viewing angle dependence curve when the CS amplitude Vcs is 5.5 V.

As shown in FIG. 12, in the viewing angle dependence curve, a bending curvature at a bending part (corresponding to an inflection point) shown by a circle becomes larger and the bending part shifts in a direction indicated by an arrow when the CS amplitude Vcs is changed from 1.5 V to 5.5 V. In the oblique view, the color balance is broken in such a bending part and the yellow tinge is caused ((B) of FIG. 17). That is, the color imbalance range in the oblique view shifts by the CS amplitude Vcs as shown by a shift of the circle in FIG. 12. Accordingly, to obtain the color tracking curve as shown in FIG. 11, it is necessary to carry out the independent gamma correction according to the CS amplitude Vcs. Here, to carry out the independent gamma correction according to the CS amplitude Vcs using the foregoing equation (3) means to carry out the independent gamma correction according to a difference between the applied voltages on the liquid crystal in the first and second sub-pixel formation portions 10a and 10b.

Figure 13:
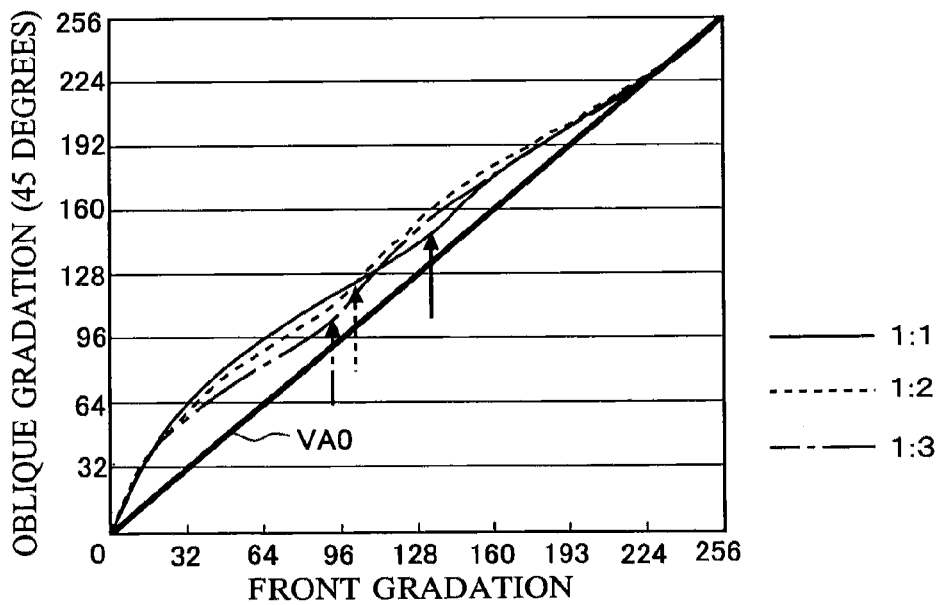
FIG. 13 is a characteristic diagram showing a state in which the viewing angle dependence of the gamma characteristics changes according to the pixel division ratio in the liquid crystal display device employing the pixel division method.

FIG. 13 is a characteristic diagram showing how the viewing angle dependence of the γ-characteristics is changed by the pixel division ratio in the liquid crystal display device employing the pixel division method and shows a relationship between the front gradation value and the oblique gradation value (viewing angle dependence curve) calculated in the same manner as in FIG. 12 for different pixel division ratios. That is, FIG. 13 shows three viewing angle dependence curves in a case where the CS amplitude Vcs is 3.5 V. A solid line shows the viewing angle dependence curve when the pixel division ratio, more specifically, an area ratio of one sub-pixel electrode whose luminance is higher of the first and second sub-pixel electrodes 14a and 14b to the other sub-pixel electrode whose luminance is lower (bright sub-pixel area to dark sub-pixel area) is 1:1, a dotted line shows a viewing angle dependence curve when the ratio of the bright sub-pixel area to the dark sub-pixel area is 1:2, and a dashed and dotted line shows a viewing angle dependence curve when a ratio of the bright sub-pixel area to the dark sub-pixel area is 1:3.

As shown in FIG. 13, in the viewing angle dependence curve, a gradation value providing the bending part (part corresponding to an inflection point) pointed by an arrow shifts to the lower gradation side when the pixel division ratio (ratio of the bright sub-pixel area to the dark sub-pixel area) is changed from 1:1 to 1:3, that is, when a ratio of the dark sub-pixel area is made larger. In the oblique view, the color balance is broken in such a bending part and the yellow tinge (FIG. 17) is caused. That is, the color imbalance range in the oblique view changes according to the pixel division ratio as shown by the arrows in FIG. 13. Accordingly, to obtain the color tracking curve as shown in FIG. 11, it is necessary to carry out the independent gamma correction according to the pixel division ratio.

As described above, the position (gradation value) where the color imbalance range appears in the oblique view depends on the pixel division ratio and the CS amplitude Vcs. Accordingly, in the present embodiment, the oblique color imbalance correction is carried out for the oblique color imbalance range determined by the pixel division ratio and the CS amplitude Vcs so as to obtain the color tracking curve as shown in FIG. 11. For example, in a case of the viewing angle dependence characteristics shown in FIG. 13 (CS amplitude Vcs is 3.5 V), the oblique color imbalance correction is carried out for a vicinity of a gradation value of 130 when the pixel division ratio is 1:1, for a vicinity of a gradation value of 100 when the pixel division ratio is 1:2, and for a vicinity of a gradation value of 90 when the pixel division ratio is 1:3.

Next, there will be described a configuration for carrying out the independent gamma correction in the present embodiment to adjust the color balance including the oblique color imbalance correction described above.

Figures 14, 15:
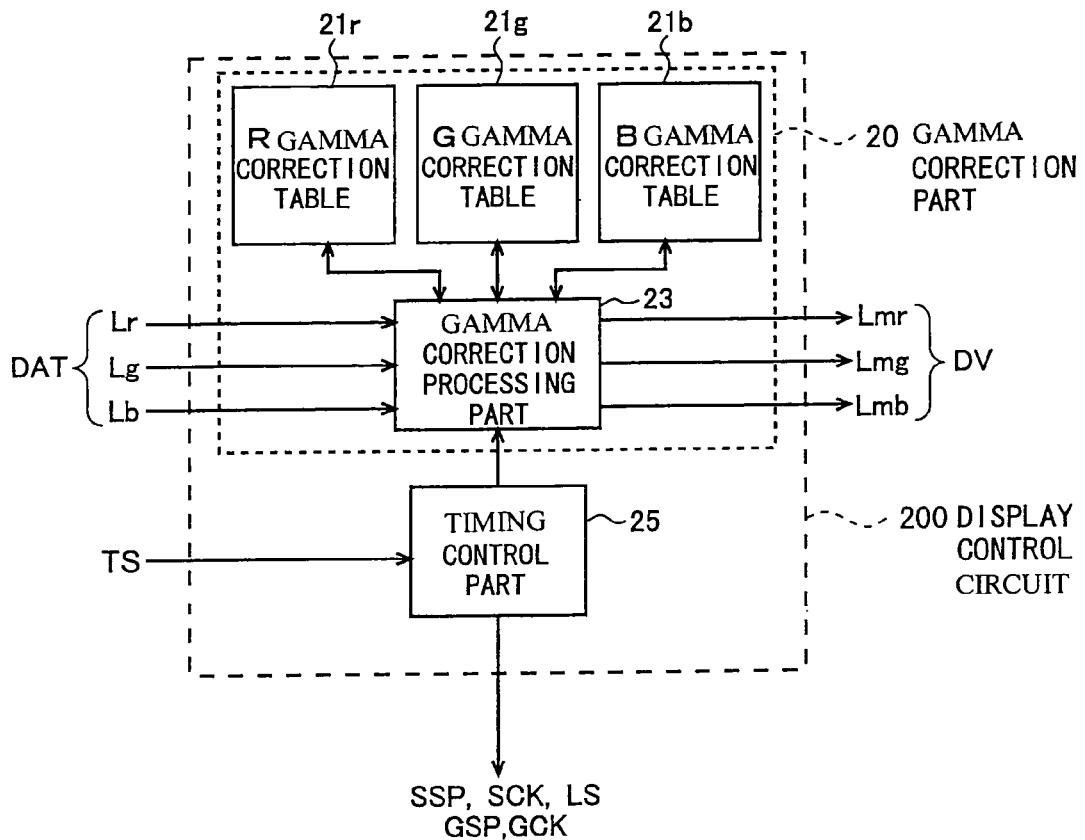
FIG. 14 is a block diagram showing a configuration of a display control circuit in the first embodiment.
FIG. 15 is a diagram for illustrating a correction table for the independent gamma correction in the first embodiment.

FIG. 14 is a block diagram showing a configuration of the display control circuit 200 in the present embodiment. This display control circuit 200 includes a gamma correction part 20 and a timing control part 25. The data signal DAT is provided from outside to the gamma correction part 20, and the timing control signal TS is provided from outside to the timing control part 25.

The timing control part 25 generates the foregoing source start pulse signal SSP, source clock signal SCK, latch strobe signal LS, gate start pulse signal GSP, gate clock signal GCK, etc based on the timing control signal TS.

The gamma correction part 20 includes a gamma correction processing part 23, an R correction table 21r, a G correction table 21g, and a B correction table 21b and, with reference to these correction tables 21r, 21g, and 21b, corrects a relationship between a gradation value indicated by the data signal DAT from outside and a luminance value of a pixel formed by the pixel formation portion 10 according to the gradation value independently for each of the primary colors (red, green, and blue). That is, the data signal DAT, which is received by the gamma correction part 20, is composed of an R gradation signal Lr exhibiting an R (red) gradation value, a G gradation signal Lg exhibiting a G (green) gradation value, and a B gradation signal Lb exhibiting a B (blue) gradation value in an image to be displayed. The gamma correction part 20 carries out an independent gamma correction, which is a combination of the conventional correction (FIG. 10) for maintaining the color balance in the almost whole gradation range (gradation value range of 32 to 255) and the oblique color imbalance correction according to the pixel division ratio and the CS amplitude Vcs, for the R, G, and B gradation signals Lr, Lg, and Lb so as to obtain the color tracking as shown in (A) of FIG. 11.

The R correction table 21r is a lookup table associating an R gradation value before gamma correction with an R gradation value after gamma correction, the G correction table 21g is a lookup table associating a G gradation value before gamma correction with a G gradation value after gamma correction, and B correction table 21b is a lookup table associating a B gradation value before gamma correction with a B gradation value after gamma correction.

The gamma correction processing part 23 carries out the independent gamma correction as shown in FIG. 15, for example, on the data signal DAT composed of the R gradation signal Lr, G gradation signal Lg, and B gradation signal Lb, using these R, G, and B correction tables 21r, 21g, and 21b, and outputs a digital image signal DV composed of an R gradation signal Lmr, G gradation signal Lmg, and a B gradation signal Lmb after the correction. That is, the gamma correction processing part 23 determines an R gradation value after the gamma correction from a gradation value before the gamma correction, that is, an R gradation value indicated by the R gradation signal Lr from outside, by referring to the R correction table 21r, and outputs a signal exhibiting the R gradation value after the gamma correction as the corrected R gradation signal Lmr. Also, the gamma correction processing part 23 determines a G gradation value after the gamma correction from a gradation value before the gamma correction, that is, a G gradation value indicated by the G gradation signal Lg from outside, by referring to the G correction table 21g, and outputs a signal exhibiting the G gradation value after the gamma correction as the corrected G gradation signal Lmg. Further, the gamma correction processing part 23 determines a B gradation value after the gamma correction from a gradation value before the gamma correction, that is, a B gradation value indicated by the B gradation signal Lb from outside, by referring to the B correction table 21b, and outputs a signal exhibiting the B gradation value after the gamma correction as the corrected B gradation signal Lmb.

The digital image signal DV composed of the corrected R gradation signal Lmr, corrected G gradation signal Lmg, and corrected B gradation signal Lmb outputted in this manner is a signal accommodating the color tracking as shown in (A) of FIG. 11 and provided to the data-signal-line drive circuit 300 as described hereinabove. Thereby, the display part 500 displays a color image exhibited by this digital image signal DV.

1.4 Generation Method of Data for the Correction Table

As described above, the independent gamma correction is carried out such that the color tracking shown (A) of FIG. 11 is obtained, and, this gamma correction refers to the R, G, and B correction tables 21r, 21g, and 21b. Accordingly, it is necessary to generate data corresponding to such an independent gamma correction for the R, G, and B correction table 21r, 21g, and 21b. Such data for the R, G, and B correction table 21r, 21g, and 21b (hereinbelow, referred to as "correction data") can be generated by the following steps, for example.

(1) First, generate the correction data for carrying out the independent gamma correction so as to suppress the gradation dependence of the chromaticity when the screen is viewed from the front, that is, to obtain the color tracking curve in the front view as shown in (A) of FIG. 10.

(2) Next, carry out a chromaticity measurement from directions of 45 degrees on the right and left side, while carrying out the independent gamma correction based on the correction data.

(3) Adjust the correction data so as to suppress the gradation dependence of the chromaticity in the oblique view (specifically, the yellow tinge) in the oblique hue correction range of the halftone according to a result of the chromaticity measurement. That is, adjust the correction data so as to shift the chromaticity in the front view from the state maintaining the color balance toward blue in the oblique hue correction range in order to reduce the yellow tinge in the oblique view in the halftone.

The color tracking shown in (A) of FIG. 11 is obtained by the independent gamma correction based on the correction data after the adjustment generated as described above. Accordingly, this correction data after the adjustment may be used for the data of the R, G, and B correction tables 21r, 21g, and 21b. Here, the method for generating the correction data described above is an example, and another method may be used for generating the correction data if the correction data is generated such that color tracking shown in (A) of FIG. 11 is obtained.

1.5 Advantages

In the present embodiment as described above, the independent gamma correction is carried out such that the values of the chromaticity coordinates, x and y, in the front view is reduced slightly from the values in the state maintaining the color balance in the oblique hue correction range in the halftone (color imbalance range) IL (the chromaticity in the front view is shifted toward blue), as shown in (A) of FIG. 11. Thereby, the values of the chromaticity coordinates, x and y, in the oblique view is suppressed from increasing above the values in the state maintaining the color balance in the oblique hue correction range IL (the shift of the chromaticity in the oblique view toward yellow is reduced). By such oblique color imbalance correction, the color imbalance of the halftone observed in the conventional color liquid crystal display device employing the pixel division method is suppressed to such an extent that matters little for a human visual sense even in the oblique view, and the color balance comes to be maintained substantially (to such an extent that matters little for a human visual sense) for the almost whole gradation range (gradation values of 32 to 255) in the oblique view as well as in the front view. As a result, it is possible to realize a display having high color reproducibility when the screen is viewed from the oblique direction as well as from the front direction, while improving the viewing angle dependence of the γ-characteristics by the pixel division method.

2. Second Embodiment

In the first embodiment, the chromaticity in the front view in the oblique hue correction range (color imbalance range) IL of the halftone is shifted toward blue, and thereby the shift of the chromaticity toward yellow in the oblique view is reduced in the oblique hue correction range IL and the color reproducibility in the oblique view is improved. However, as shown in (A) of FIG. 11, when the gradation value is reduced from 255 to 0, a shift amount of the chromaticity from the state maintaining the color balance is switched from increase to decrease at a predetermined gradation value in the halftone. That is, while the chromaticity shifts toward blue (negative direction) along with a reduction in the gradation value in the range of the gradation values larger than the predetermined gradation value, the chromaticity shifts toward yellow (positive direction) along with a reduction in the gradation value in the range of gradation values smaller than the predetermined gradation value. This means that the color tracking curve has a local minimum point at the predetermined gradation value. Such an extremal point of the color tracking curve in the halftone makes a viewer to feel an unnatural chromaticity change.

Accordingly, in a color liquid crystal display device according to a second embodiment of the present invention, the independent gamma correction is carried out so as not to cause such an unnatural chromaticity change. Hereinbelow, there will be described a liquid crystal display device according to such present embodiment. Here, a configuration of the present embodiment is the same as that of the first embodiment except for an configuration of R, G, and B gamma correction tables and part of a configuration in a display part 500 (details to be described below), and therefore the same part or a corresponding part is designated by the same reference symbol and detailed description thereof will be omitted.

Figure 16:
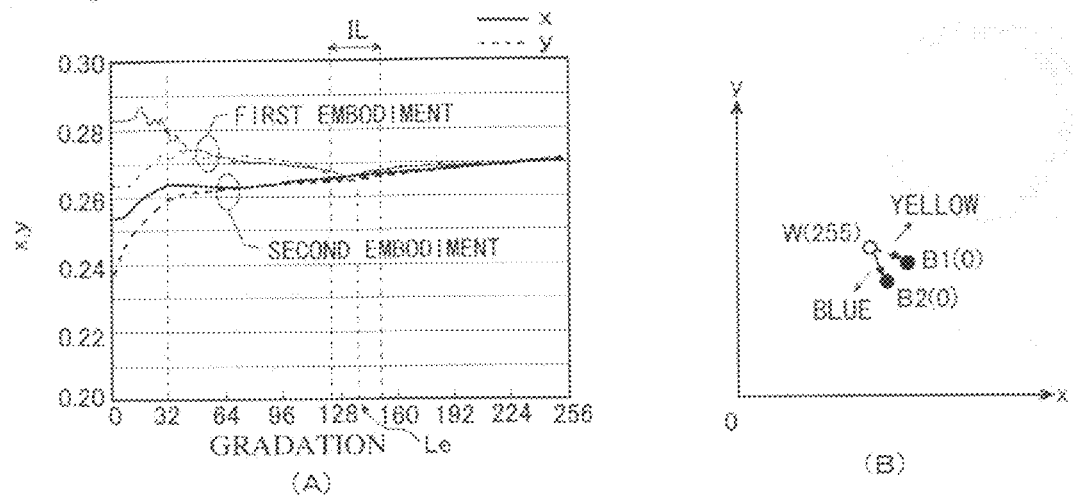
FIG. 16 consists of a characteristic diagram (A) and a chromaticity diagram (B) respectively for illustrating the independent gamma correction for obtaining the color tracking in a second embodiment of the present invention.

The R, G, and B gamma correction tables 21r, 21g, and 21b in the present embodiment are determined such that the independent gamma correction is carried out by a gamma correction processing part 23 for obtaining a color tracking in the front view as shown by curves of a bold solid line and dotted line in (A) of FIG. 16 (refer to FIG. 14). Here, curves of a fine solid line and dotted line represent the color tracking in the front view in the foregoing first embodiment in (A) of FIG. 16 (refer to (A) of FIG. 11).

In the present embodiment, the independent gamma correction is carried out by the gamma correction processing part 23 as described below with reference to the R, G, and B γ-correction tables 21*r*, 21*g*, and 21*b*.

An oblique hue correction range IL shown in (A) of FIG. 16 is the same as the oblique hue correction range IL in the first embodiment and determined by the pixel division ratio and the CS amplitude Vcs (refer to FIG. 12 and FIG. 13). In the present embodiment, the independent gamma correction is carried out such that chromaticity (values of the chromaticity coordinates x and y) in the front view in this oblique hue correction range IL becomes the same as the extremal value in the chromaticity of the color tracking curve at the gradation value where the chromaticity of the color tracking curve in the front view in the first embodiment becomes minimum (a gradation value approximately at the center of the oblique hue correction range IL) Le, and such that the chromaticity (values of the chromaticity coordinates x, and y) changes monotonically along with a change of the gradation value L.

For carrying out such independent gamma correction, correction data (data to be set in the R, G, and B correction tables 21*r*, 21*g*, and 21*b*) can be generated as follows, for example. That is, the correction data obtained by the foregoing generation method in the first embodiment (correction data corresponding to the color tracking in the first embodiment shown by the curves of a fine solid line and dotted line in (A) of FIG. 16) may be adjusted such that a color tracking curve in the front view changes monotonically as shown by the curves of a bold solid line and dotted line. Note that this correction data generation method is an example and the correction data may be generated by another method if the correction data is generated such that the color tracking as shown in (A) of FIG. 16 is obtained.

Here, as shown in (A) of FIG. 16, the present embodiment employs a color filter or a polarizer plate having a black chromaticity shifted toward blue in a display part 500 so as to change the color tracking curve monotonically even in a gradation value range of 0 to 32. As shown in (B) of FIG. 16, a position of black (zero gradation value) B2 (0) of the present embodiment in the chromaticity diagram is slightly different from a position of black B1 (0) in the first embodiment or a conventional example. Here, a color filter or a polarizer the same as conventional ones may be used replacing such color filter or polarizer plate.

In the present embodiment as described above, the chromaticity in the front view is shifted toward blue to the same extent as in the first embodiment in the oblique hue correction range (color imbalance range) IL in the halftone, and thereby the shift toward yellow in the halftone is suppressed in the oblique view as in the first embodiment and the color reproducibility is improved. Further, the color tracking curve in the front view changes monotonically and thereby the chromaticity shift by the gradation value becomes not to provide a sense of discomfort to a viewer differently from the case in the first embodiment.

3. Variation

In the first and second embodiments, the independent gamma correction based on the correction tables 21*r*, 21*g*, and 21*b* provides an appropriate color tracking and realizes a display having a high color reproducibility in the oblique view as well as in the front view. However, a method of such independent gamma correction for improving the color reproducibility is not limited to a method to correct the gradation signal Lr, Lg, or Lb according to the correction table, but may be any method to correct a relationship between a gradation value indicated by the signal inputted in the liquid crystal display device as a signal representing an image to be displayed and a luminance value of R, G, or B pixel according to the gradation value. For example, the gamma correction may be carried out by a configuration providing R, G, and B γ-correction correction voltage generating circuits for generating R, G, and B gradation voltages from R, G, and B reference input voltages, respectively, (individual setting of R, G, and B γ-correction curve) as described in Japanese Unexamined Patent Application Publication No. 2002-258813 (patent reference 1).

Although the first and second embodiments divide each pixel into two sub-pixels spatially for improving the viewing angle dependence of the γ-characteristics as shown in (A) of FIG. 3, the present invention can be applied to a case where each pixel is divided into three or more sub-pixels. In this case, two color imbalance ranges appear in the halftone, but the independent gamma correction may be carried out such that the chromaticity in the front view is shifted toward blue in each of the color imbalance ranges for reducing the yellow tinge in the oblique view. Thereby, it is possible to realize a display having a good color reproducibility in the oblique view as well as in the front view.

Also, although the first and second embodiments employ the spatial pixel division method as described hereinabove ((A) of FIG. 3), the same problem exists and the present invention can be applied in the case of a configuration in which one frame period is divided into a plurality of sub-frames and an average luminance value in the plurality of sub-frames becomes a luminance value of each pixel, that is, in a case in which a temporal pixel division method is employed.

INDUSTRIAL APPLICABILITY

The present invention can be applied to a color liquid crystal display device employing the pixel division method in which each pixel of a displayed image is composed of a predetermined number of two or more sub-pixels obtained by spatial or temporal division of one pixel.

The invention claimed is:

1. A color liquid crystal display device configured to employ a pixel division method in which each pixel of an image displayed in a screen is configured with two or more sub-pixels obtained by spatial or temporal division of one pixel in a division ratio, the device comprising:

a plurality of pixel formation portions corresponding to respective pixels of the image, each of the pixel formation portions configured to form a pixel of any of primary colors for color display with the two or more sub-pixels;

a drive circuit configured to provide each of the pixel formation portions with applied voltages corresponding to the two or more sub-pixels composing the pixel to be formed by that pixel formation portion, based on a gradation value indicated by an input signal provided from outside as a video signal representing the image;

a gamma correction part configured to correct a relationship between the gradation value indicated by the input signal and a luminance value of the pixel to be formed by that pixel formation portion according to the gradation value independently for each of the primary colors for color display; and a common electrode provided commonly at the plurality of pixel formation portions;

each of the pixel formation portions including, first and second sub-pixel electrodes facing the common electrode, a liquid crystal layer between the first sub-pixel electrode and the common electrode, as well as between the second sub-pixel electrode and the common electrode, a first auxiliary electrode disposed so as to form a first auxiliary capacitance between the first sub-pixel electrode and the first auxiliary electrode, and a second auxiliary electrode disposed so as to form a second auxiliary capacitance between the second sub-pixel electrode and the second auxiliary electrode, the drive circuit including, a pixel electrode drive circuit configured to provide a voltage according to the input signal to the first and second sub-pixel electrodes with the common electrode as a reference, and an auxiliary electrode drive circuit configured to apply voltages, which are different from each other and change in period and amplitude, to the first and second auxiliary electrodes, wherein each of the pixel formation portions forms the respective pixel by displaying the two or more sub-pixels with luminance values different from one another based on the applied voltages, wherein the gamma correction part is further configured to correct the relationship such that gradation dependence of chromaticity is suppressed when the screen is viewed from a front thereof, and also corrects the relationship in a vicinity of the gradation value, which is determined by the division ratio in the one pixel and differences in the applied voltages among the two or more sub-pixels, such that the gradation dependence of chromaticity is suppressed when the screen is viewed from an oblique direction, and wherein the gradation value is determined by an area ratio of the first sub-pixel electrode to the second sub-pixel electrode and a difference in the applied voltages between the first auxiliary electrode and the second auxiliary electrode.

2. The color liquid crystal display device according to claim 1, wherein the gamma correction part is further configured to correct the chromaticity when viewed from the front to be shifted from a state maintaining a color balance toward blue in the vicinity of the gradation value such that the gradation dependence of chromaticity is suppressed when viewed from the oblique direction.

3. The color liquid crystal display device according claim 1, wherein the gamma correction part is further configured to correct the relationship such that a curve representing the gradation dependence of chromaticity when viewed from the front becomes approximately flat in a range except for the vicinity of the gradation value.

4. The color liquid crystal display device according claim 1, wherein the gamma correction part is further configured to correct the relationship such that a curve representing the gradation dependence of chromaticity when viewed from the front changes approximately monotonically with respect to the gradation value.

5. The color liquid crystal display device according claim 1, wherein the gamma correction part includes a correction table associating a gradation value before correction with a gradation value after correction for each of the primary colors for color display in order to correct the relationship, and outputs the gradation value after correction associated with the gradation value indicated by the input signal referring to the correction table, and wherein the drive circuit is further configured to provide each of the pixel formation portions with the applied voltages based on the gradation value after correction.

* * * * *